US012658785B2

(12) United States Patent
Young et al.

(10) Patent No.: US 12,658,785 B2
(45) Date of Patent: Jun. 16, 2026

(54) APPARATUS AND METHODS FOR SWITCH-MODE POWER SUPPLY START-UP

(71) Applicant: Analog Devices, Inc., Wilmington, MA (US)

(72) Inventors: Eric Young, Apex, NC (US); David Lahm, Raleigh, NC (US)

(73) Assignee: ANALOG DEVICES, INC., Wilmington, MA (US)

( * ) Notice: Subject to any disclaimer, the term of this patent is extended or adjusted under 35 U.S.C. 154(b) by 316 days.

(21) Appl. No.: 18/175,788

(22) Filed: Feb. 28, 2023

(65) Prior Publication Data

US 2023/0291306 A1     Sep. 14, 2023

Related U.S. Application Data

(60) Provisional application No. 63/268,815, filed on Mar. 3, 2022.

(51) Int. Cl.
  *H02M 1/36*       (2007.01)
  *H02M 1/00*       (2007.01)
  *H02M 3/158*      (2006.01)

(52) U.S. Cl.
  CPC ........... *H02M 1/36* (2013.01); *H02M 1/0025* (2021.05); *H02M 3/158* (2013.01)

(58) Field of Classification Search
  CPC ...... H02M 1/0025; H02M 1/36; H02M 3/156; H02M 3/158; H02M 3/1588
  See application file for complete search history.

(56) References Cited

U.S. PATENT DOCUMENTS

| | | | |
|---|---|---|---|
| 7,710,700 B2 | 5/2010 | Young | |
| 7,746,300 B2 | 6/2010 | Zhang et al. | |
| 7,982,447 B2 * | 7/2011 | Chellamuthu | H02M 3/156 |
| | | | 323/285 |
| 8,116,045 B2 | 2/2012 | Young | |
| 8,884,592 B2 * | 11/2014 | Mirea | H02M 3/1563 |
| | | | 323/282 |
| 10,368,410 B2 | 7/2019 | Qi et al. | |
| 10,686,381 B1 | 6/2020 | Zhang et al. | |
| 2006/0152874 A1 | 7/2006 | Young | |
| 2007/0257861 A1 | 11/2007 | Zhang et al. | |
| 2008/0266907 A1 * | 10/2008 | Kim | H02M 3/33523 |
| | | | 363/21.1 |
| 2009/0001946 A1 * | 1/2009 | Mehas | H02M 1/36 |
| | | | 323/266 |
| 2010/0188784 A1 | 7/2010 | Young | |

(Continued)

*Primary Examiner* — Gustavo A Rosario-Benitez
(74) *Attorney, Agent, or Firm* — Knobbe, Martens, Olson & Bear, LLP

(57)     ABSTRACT

Apparatus and methods for switch-mode power supply start-up are provided herein. In certain embodiments, a switch-mode power supply includes an inductor and one or more power switches used to control a current through the inductor to provide voltage regulation. The switch-mode power supply uses external voltage levels to regulate one or more internal control signals (for example, for opening or closing the one or more power switches) to their zero output current switching state at the appropriate switch duty cycle. Furthermore, the switch-mode power supply can be implemented to provide a first pulse timing signal to establish the inductor current waveform for zero net output current delivery to a load.

20 Claims, 9 Drawing Sheets

(56) References Cited

U.S. PATENT DOCUMENTS

| | | | |
|---|---|---|---|
| 2010/0270988 A1* | 10/2010 | De Cremoux | H02M 3/1582 |
| | | | 323/282 |
| 2011/0089918 A1* | 4/2011 | Chang | H02M 3/157 |
| | | | 323/282 |
| 2011/0204866 A1* | 8/2011 | Moon | H02M 1/36 |
| | | | 323/284 |
| 2014/0111110 A1 | 4/2014 | Qi et al. | |
| 2014/0239925 A1* | 8/2014 | Tanabe | H02M 3/158 |
| | | | 323/271 |
| 2014/0266122 A1* | 9/2014 | Zhu | H02M 3/156 |
| | | | 323/284 |
| 2014/0375291 A1* | 12/2014 | Tomasz | H02M 3/156 |
| | | | 323/282 |
| 2016/0380541 A1* | 12/2016 | Moon | G01R 19/04 |
| | | | 323/271 |
| 2017/0070149 A1* | 3/2017 | Guan | H02M 1/36 |
| 2017/0222557 A1* | 8/2017 | Crawley | G01R 19/0038 |
| 2018/0123581 A1* | 5/2018 | Chiu | H03K 17/166 |

* cited by examiner

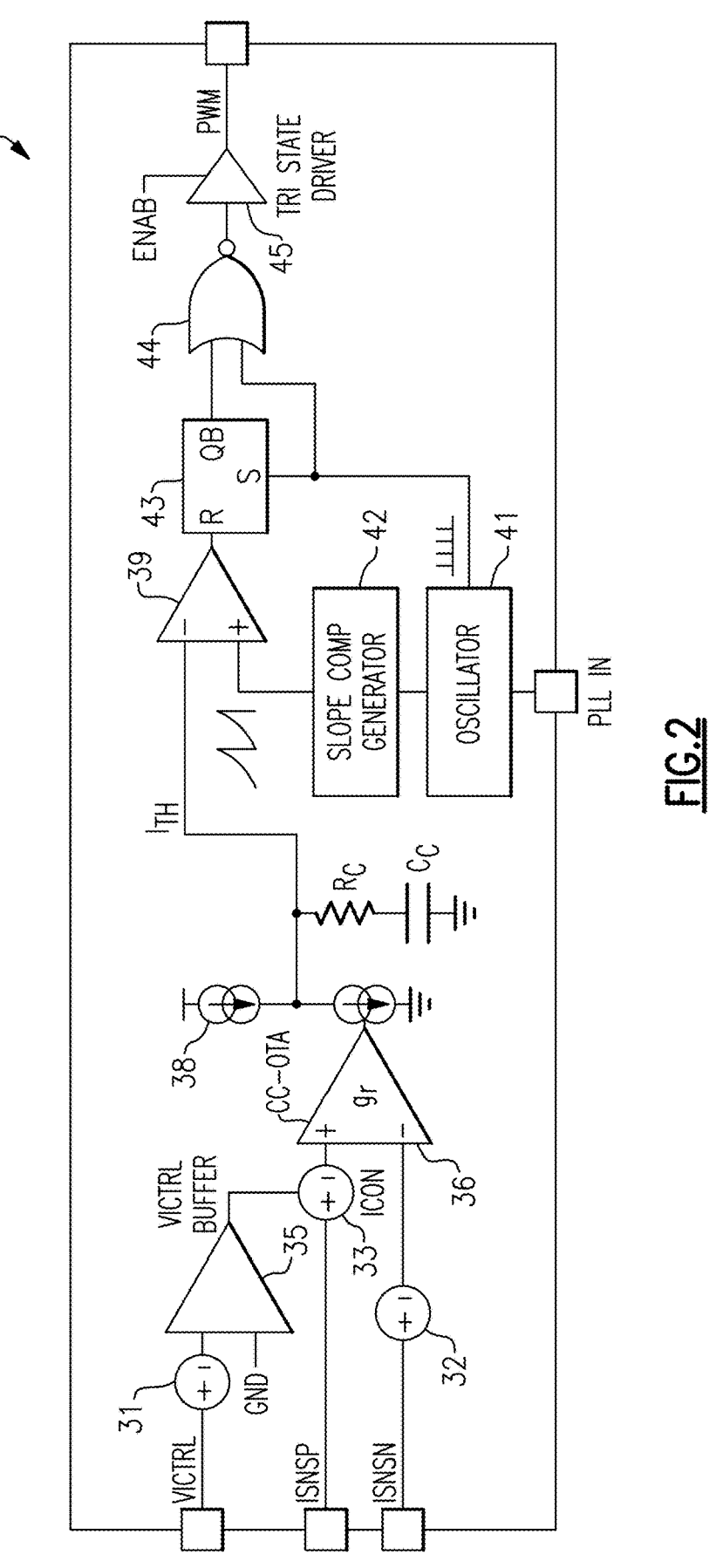
_FIG.2_

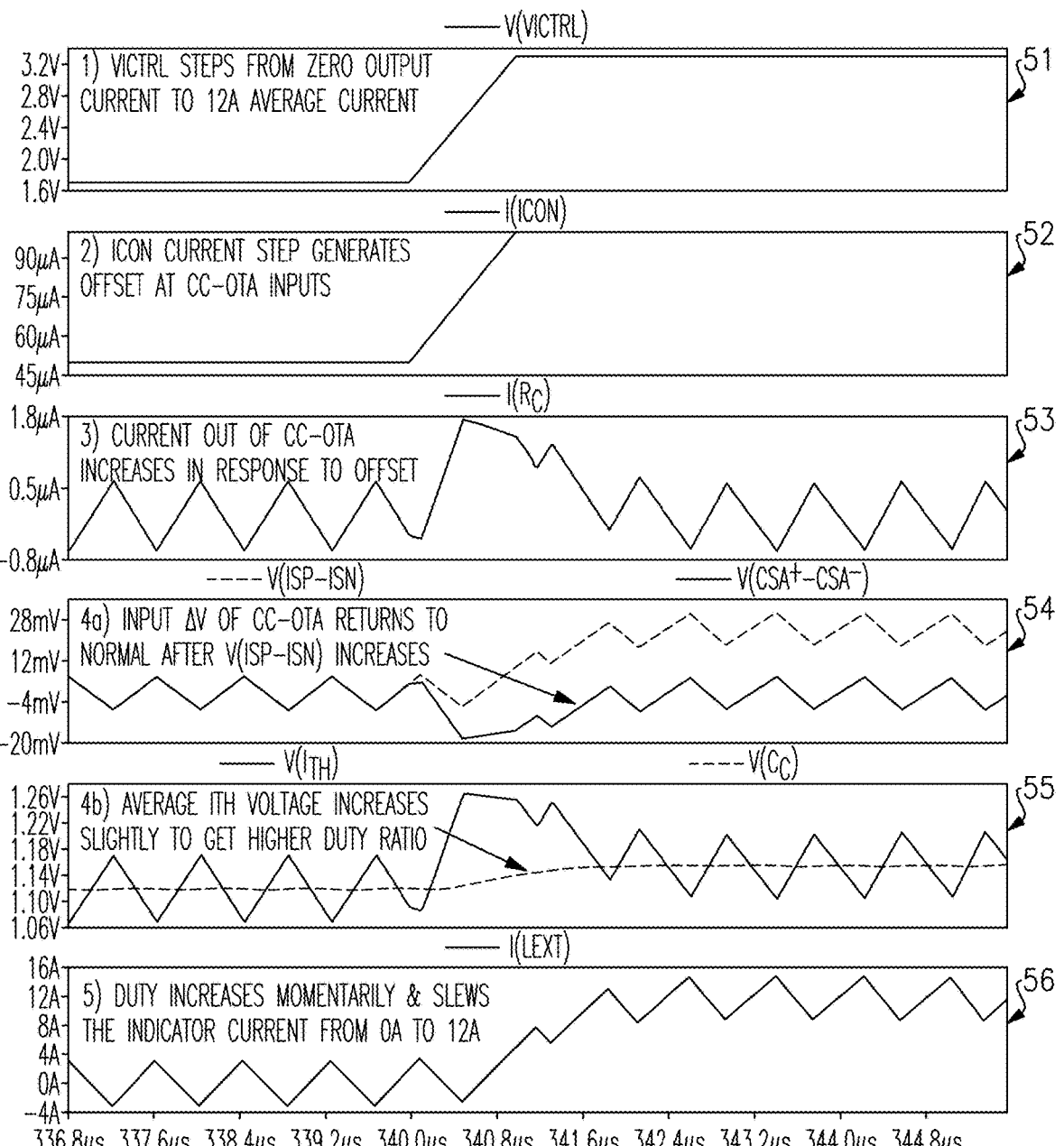

—— V(VICTRL)

3.2V
2.8V
2.4V
2.0V
1.6V
1) VICTRL STEPS FROM ZERO OUTPUT
CURRENT TO 12A AVERAGE CURRENT
51

—— I(ICON)

90μA
75μA
60μA
45μA
2) ICON CURRENT STEP GENERATES
OFFSET AT CC-OTA INPUTS
52

—— I(R_C)

1.8μA
0.5μA
−0.8μA
3) CURRENT OUT OF CC-OTA
INCREASES IN RESPONSE TO OFFSET
53

- - - - V(ISP−ISN)          —— V(CSA⁺−CSA⁻)

28mV
12mV
−4mV
−20mV
4a) INPUT ΔV OF CC-OTA RETURNS TO
NORMAL AFTER V(ISP−ISN) INCREASES
54

—— V(I_TH)          - - - - V(C_C)

1.26V
1.22V
1.18V
1.14V
1.10V
1.06V
4b) AVERAGE ITH VOLTAGE INCREASES
SLIGHTLY TO GET HIGHER DUTY RATIO
55

—— I(LEXT)

16A
12A
8A
4A
0A
−4A
5) DUTY INCREASES MOMENTARILY & SLEWS
THE INDICATOR CURRENT FROM 0A TO 12A
56

APPARATUS AND METHODS FOR SWITCH-MODE POWER SUPPLY START-UP

CROSS-REFERENCE TO RELATED APPLICATIONS

The present application claims priority to U.S. Provisional Patent Application No. 63/268,815, filed Mar. 3, 2022, and titled "APPARATUS AND METHODS FOR SWITCH-MODE POWER SUPPLY START-UP," the entirety of which is hereby incorporated herein by reference.

FIELD OF THE DISCLOSURE

Embodiments of the invention relate to electronics, and more particularly, to switch-mode power supplies.

BACKGROUND

A voltage regulator serves to generate a substantially constant output voltage from a poorly-specified and/or fluctuating supply voltage or other input voltage source. Series regulators and switching regulators are two common types of voltage regulators. Low dropout (LDO) series regulators provide good regulation with very low noise, however, the current supply from the regulated output comes directly from the supply voltage. Thus, an LDO series regulator's efficiency is limited by the ratio of the output voltage to the supply voltage, and thus the efficiency of the LDO series regulator drops rapidly as the supply voltage increases relative to the output voltage.

Switching regulators are generally more efficient than series regulators. A switching regulator employs one or more power switches coupled in series and/or parallel with an output terminal that provides an output voltage to a load. Additionally, a controller turns the switches ON and OFF to control delivery of current pulses to the output terminal. One or more energy storage elements, such as inductor(s) and/or capacitor(s), can be used to convert the switched current pulses into a steady load current.

SUMMARY OF THE DISCLOSURE

Apparatus and methods for switch-mode power supply start-up are provided herein. In certain embodiments, a switch-mode power supply includes an inductor and one or more power switches used to control a current through the inductor to provide voltage regulation. The switch-mode power supply uses external voltage levels to regulate one or more internal control signals (for example, for opening or closing the one or more power switches) to their zero output current switching state at the appropriate switch duty cycle. Furthermore, the switch-mode power supply can be implemented to provide a first pulse timing signal to establish the inductor current waveform for zero net output current delivery to a load.

In one aspect, a switch-mode converter includes a first power switch configured to control an output current to an inductor to regulate an output voltage, the first power switch connected between a first supply voltage and one end of the inductor. The switch-mode converter further includes a controller configured to control the first power switch based on a pulse width modulation (PWM) signal, and a start-up circuit configured to set an initial value of the PWM signal based on sensing the output voltage and sensing the first supply voltage.

In another aspect, a method of voltage regulation in a switch-mode converter is provided. The method includes regulating an output voltage by controlling an output current from a first power switch to an inductor, the first power switch connected between a first supply voltage and one end of the inductor. The method further includes controlling the first power switch based on a pulse width modulation (PWM) signal from a controller, and setting an initial value of the PWM signal based on sensing the output voltage and sensing the first supply voltage.

In another aspect, a switch-mode converter system includes an inductor connected between a switch terminal and an output terminal, and a switch-mode converter. The switch-mode converter includes a first power switch configured to control an output current to the inductor to regulate an output voltage at the output terminal, the first power switch connected between a first supply voltage and the switch terminal. The switch-mode converter further includes a controller configured to control the first power switch based on a pulse width modulation (PWM) signal, and a start-up circuit configured to set an initial value of the PWM signal based on sensing the output voltage and sensing the first supply voltage.

BRIEF DESCRIPTION OF THE DRAWINGS

FIG. 2 is a schematic diagram of a pulse-width modulation control circuit according to one embodiment.

FIG. 3 are graphs of one example of simulation results for the pulse-width modulation control circuit of FIG. 2.

DETAILED DESCRIPTION OF EMBODIMENTS

Figure 1:
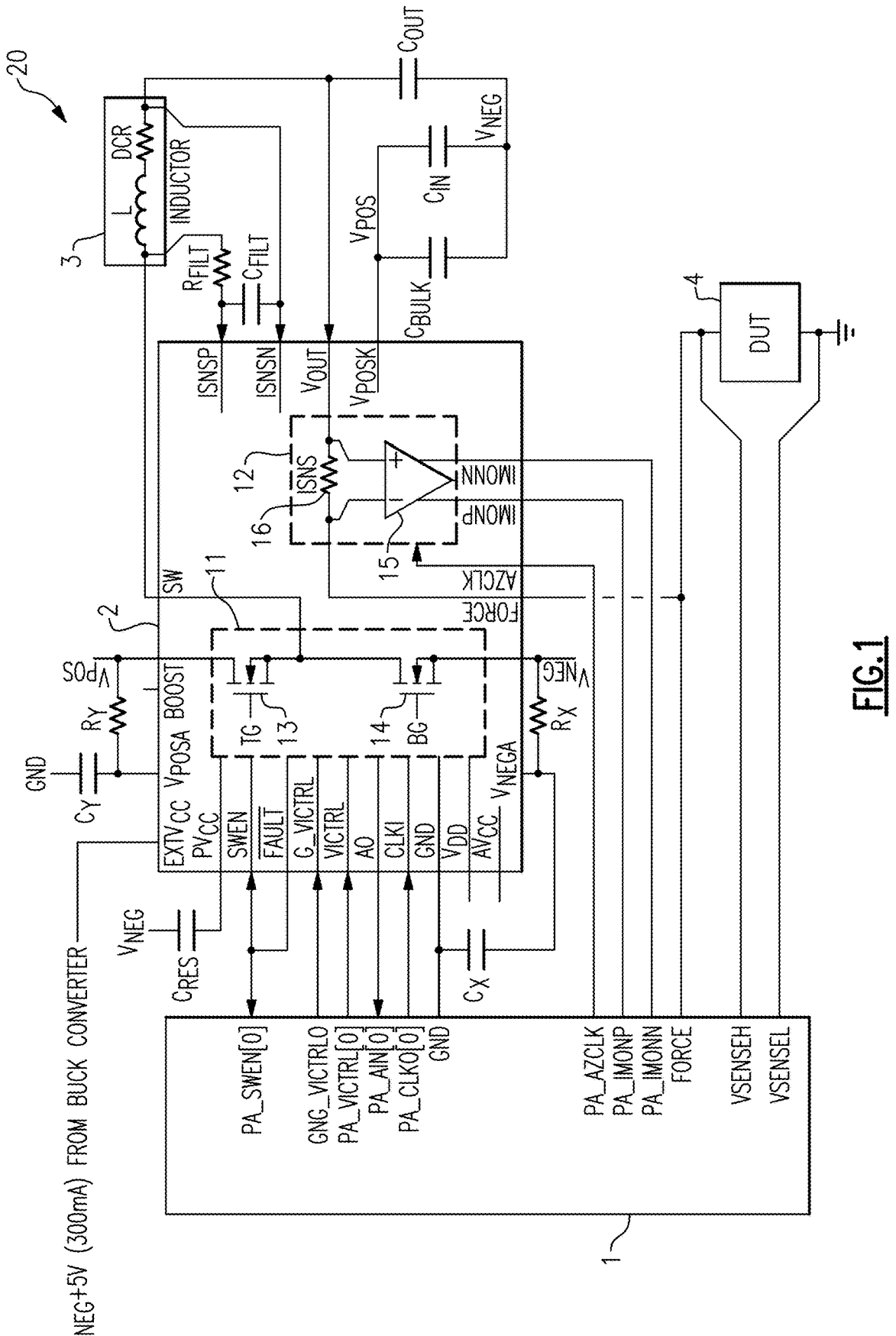
FIG. 1 is a schematic diagram of one embodiment of a switch-mode converter system.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Certain switching regulators provide voltage regulation by controlling a current through an inductor. For example, buck converters, boost converters, and buck-booster converters are examples of such switching regulators. A switching regulator that provides voltage regulator by controlled a current through an inductor is also referred to as a switch-mode inductor-based power supply or switch-mode inductor-based converter.

In certain applications, such as automated test equipment (ATE), a switch-mode inductor-based power supply is specified to start into a pre-regulated load while causing little to no transient disruption. Moreover, the switch-mode inductor-based power supply is specified to perform in this manner without being isolated from the load while control signals internal to that supply reach a steady state.

Such performance specifications can be difficult to meet and/or require large amounts of overhead.

In a first example, an inline disconnect switch is included between the output of the converter and the load and is used to isolate the output of the converter from the load while the control nodes reach steady-state. However, this technique adds output resistance that leads to power dissipation and may not be practical when the converter's output filter is insufficient to prevent activation of parasitic diodes that bypass the disconnect switch.

In a second example, multiple switchers are included and the control node of an idle switcher is connected to the control node of an active switcher. This technique presupposes that a switcher of identical control characteristics and identical output current state is operating at all times to serve as a reference value for the control signal. However, this requirement is not likely to be satisfied due to manufacturing tolerances between different devices. Moreover, such a technique has large overhead due to the added switcher operating a zero current in parallel with a (reference) switcher operating at a non-zero load.

In a third example, a switcher with pulse width modulation (PWM) dimming can occasionally strobe the switcher to the on-state and reach steady-state, while storing the control node voltage on a low leakage reservoir capacitor, digitizing the capacitor's voltage value, and refreshing the reservoir capacitor when the capacitor's voltage value falls out of compliance. However, this technique does not allow for changes in output voltage and/or duty cycle, which could be caused by other regulators driving the load. Furthermore, the control node voltage is typically dependent on duty cycle due either to slope compensation in peak current mode control or the modulating ramp in voltage mode control.

In a fourth example, a look-up table that controls a digital-to-analog converter (DAC) can be used to set appropriate control voltage and timings for startup. However, such a lookup table would need to be customized for each device due to manufacturing tolerances that would change the key voltages, and temperature biases may have to be added to compensate for temperature drift of the voltages. Such compensation is costly and cumbersome.

Apparatus and methods for switch-mode power supply start-up are provided herein. In certain embodiments, a switch-mode power supply includes an inductor and one or more power switches used to control a current through the inductor to provide voltage regulation. The switch-mode power supply uses external voltage levels to regulate one or more internal control signals (for example, for opening or closing the one or more power switches) to their zero output current switching state at the appropriate switch duty cycle. Furthermore, the switch-mode power supply can be implemented to provide a first pulse timing signal to establish the inductor current waveform for zero net output current delivery to a load.

In certain implementations, the start-up technique combines currents derived from the output voltage and supply voltage to emulate duty cycle for continuous conduction mode to charge and discharge the control (compensation) node. For example, the charge and discharge phases of the compensation node are switched with the pulse width modulation (PWM) signal that controls the power switches, but the power switches themselves are tri-stated during this mode of operation. The appropriate compensation node voltage state is established by repeated cycles of charge and discharge with the switched currents.

By implementing the switch-mode power supply in this manner, a performance improvement is provided relative to a configuration in which the control node serves as an integration node directly at the output of an error amplifier, and in which the error amplifier is deactivated when the switcher is idle.

In certain implementations, a first-pulse timer uses the same currents and a charge-discharge timer to set the length of a switch half interval in steady state. Since the inductor current is starting at zero, to reach a negative or positive peak of the current waveform that will deliver net zero output current only half of a switching period can be used (for example, the switching period that is not controlled by the modulator can be selected to start). Accordingly, internal currents can be used for charging and discharging a compensation node and timer nodes.

In certain implementations, a small capability charge pump is started at some interval in advance of the start of actual switching to ensure that the flying switch power supply is at a nominal value at the start of switching. In comparison, having this feature activated at all times could disrupt sensitive current or voltage measurements on the pre-regulated load when the high current switcher is not enabled, while not having this feature could distort the first pulse to provide boost refresh so that a large disturbance of the output voltage is realized with a long time constant for recovery.

Accordingly, in certain implementations, the switch-mode power supply is implemented to provide adequate voltage supply to drive a flying switch without compromising the ability of the first pulse to provide a boost refresh.

FIG. 1 is a schematic diagram of one embodiment of a switch-mode converter system 20. The switch-mode converter system 20 includes a control and sense circuit 1, a switch-mode converter 2, an inductor 3, a load 4 (corresponding to a device under test or DUT, in this embodiment), a capacitor $C_{RES}$, a capacitor $C_X$, a capacitor $C_Y$, a capacitor $C_{BULK}$, a capacitor $C_{IN}$, a capacitor $C_{OUT}$, a filter capacitor $C_{FILT}$, a resistor $R_X$, a resistor $R_Y$, and a filter resistor $R_{FILT}$.

Although one embodiment of a switch-mode converter system is shown, the teachings herein are applicable to switch-mode converter systems implemented in other ways.

In certain implementations, the control and sense circuit 1 is formed on a first semiconductor die and the switch-mode converter 2 is formed on a second semiconductor die.

The control and sense circuit 1 includes a variety of terminals (which can correspond to pins or pads of a semiconductor die) including PA_SWEN[0], GNG_VIC-TRL0, PA_VICTRL[0], PA_AIN[0], PA_CLKO[0], GND, PA_AZCLK, PA_IMONP, PA_IMONN, FORCE, VSENSEH, and VSENSEL. The control and sense circuit 1 serves to control the switch-mode converter 2, to pre-regulate the load 4, and to measure one or more electrical characteristics of the load 4. For example, the control and sense circuit 1 can use the FORCE terminal to pre-regulate the load, and use the VSENSEH and VENSEL terminals to measure a voltage across the load 4. Prior to measuring the electrical characteristic(s) of the load 4, the control and sense circuit 1 can control the switch-mode converter to force a voltage across the load 4, which is connected between the FORCE terminal and ground.

With continuing reference to FIG. 1, the switch-mode converter 2 includes power switches 11, a current sensing circuit 12, and various terminals (which can correspond to pins or pads of a semiconductor die) including $EXTV_{CC}$, $V_{POSA}$, BOOST, $V_{POS}$, SW, $PV_{CC}$, SW_EN, FAULT, G_VICTRL, VICTRL, AO, CLKI, GND, $V_{DD}$, $AV_{CC}$, $V_{NEGA}$, $V_{NEG}$, FORCE, AZCLK, IMONP, IMONN, ISNSP, ISNSN, $V_{OUT}$, and $V_{POSK}$.

As shown in FIG. 1, the power switches 11 include a top power switch 13 (also referred to as a first or high side power switch) and a bottom power switch 14 (also referred to as a second or low side power switch). The top power switch 11 and the bottom power switch 12 are connected in series between the $V_{POS}$ terminal (which is powered by a first or power high supply voltage) and the $V_{NEG}$ terminal (which is powered by a second or power low supply voltage). In particular, the top power switch 11 includes a drain connected to the VPOS terminal, a gate controlled by a top gate control signal TG, and a source and a body connected to the SW terminal. Additionally, the bottom power switch 12 includes a drain connected to the SW terminal, a gate controlled by a bottom gate control signal BG, and a source and a body connected to the $V_{NEG}$ terminal. The switch-mode converter 2 is powered using a supply voltage received at the $EXTV_{CC}$ terminal. In this example, the supply voltage to the switch-mode converter 2 is provided by a buck converter and is +5V above the voltage of the $V_{NEG}$ terminal and supports a 300 mA current draw.

The inductor 3 is connected between the SW terminal and the $V_{OUT}$ terminal, and includes a series combination of an inductance L and a DC resistance (DCR). The filter resistor $R_{FILT}$ is connected between the SW terminal and the ISNSP terminal, while the filter capacitor $C_{FILT}$ is connected between the ISNSP and ISNSN terminal. Thus, the filter resistor $R_{FILT}$ and the filter capacitor $C_{FILT}$ provide the ISNSP and ISNSN terminals with a filtered sensed voltage across the inductor 3.

With continuing reference to FIG. 1, the current sensing circuit 12 includes a sense amplifier 15 and a sense resistor 16. The sense resistor 16 is connected between the $V_{OUT}$ terminal and the FORCE terminal. A differential input of the sense amplifier 15 is connected across the sense resistor 16 to thereby measure a sense signal ISNS. Additionally, a differential output of the sense amplifier 15 controls the IMONP and IMONN terminals (which in turn are connected to the PA_IMONP and PA_IMONN terminals of the control and sense circuit 1). Thus, control and sense circuit 1 is informed of the value of the sense signal ISNS to determine an amount of current through the inductor 3.

In the illustrated embodiment, the voltage of the VICTRL terminal (for example, a 0.1V to 3.3V) set by the control and sense circuit 1 determines the target current through the inductor 3, which is measured across the ISNSP and ISNSN terminals.

Additionally, a peak-mode control modulation circuit of the switch-mode converter 2 sets the duty cycles of the top gate control signal TG and the bottom gate control signal BG to regulate the target current through the inductor 3.

The control and sense circuit 1 pre-regulates the voltage across the load 4 (by way of the FORCE terminal of the control and sense circuit 1) and enables the switch-mode converter 2 to control the voltage across the load 4 (by way of the FORCE terminal of the switch-mode converter 2). In certain implementations, proportional/integral/derivative (PID) control is used.

Thus, the control of the voltage across the load 4 is transitioned from the control and sense circuit 1 (which provides pre-regulation) to the switch-mode converter 2. When the control and sense circuit 1 is pre-regulating, the power switches 11 are turned-off. However, when the switch-mode converter 2 is controlling the voltage across the load 4, the power switches 11 are turned on and off with a desired duty cycle to provide suitable voltage regulation.

In the illustrated embodiment, the switch-mode converter 2 is specified to start into a pre-regulated load 4 while causing little to no transient disruption. Moreover, the switch-mode converter 2 is specified to perform in this manner without being isolated from the load 4 while control signals internal to the pre-regulated load 4 reach a steady state.

FIG. 2 is a schematic diagram of a pulse-width modulation (PWM) control circuit 50 according to one embodiment.

The PWM control circuit 50 depicts one embodiment of PWM control circuitry that can be included in a switch-mode converter, such as the switch-mode converter 2. For example, the PWM control circuit 50 can generate a PWM control signal used to control gate voltage to turn on or off one or more power switches, such as the power switches 11 of FIG. 1. Although one embodiment of PWM control circuitry is shown, PWM control circuits can be implemented in other ways.

In the illustrated embodiment, the PWM control circuit 50 includes a terminal VICTRL for receiving an input control voltage (for example, from the PA_VICTRL[0] terminal of the control and sense circuit 1 of FIG. 1), a PWM terminal (for controlling the gate of one or more power switches, for example, for generating the top gate control signal TG for controlling the top power switch 13 of FIG. 1), a PLL IN terminal (for receiving a reference clock signal), and ISNSP and ISNSN terminals for receiving a sensed voltage across an inductor used for regulation (for example, the voltage across the inductor 3 of FIG. 1 after low-pass filtering). The PWM control circuit 40 further includes a first voltage source 31, a second voltage source 32, a controllable voltage source 33, a buffer 35, a controllable current operational transconductance amplifier (CC-OTA) 36 (with transconductance $g_m$), a reference current source 38, a resistor $R_C$, a capacitor $C_C$, a comparator 39, a controllable oscillator 41, a slope compensation (comp) generator 42, a set-reset flip-flop 43, a NOR gate 44, and a tri-state driver 45 (controlled by an enable signal ENAB).

The VICTRL terminal receives an input control voltage (for example, 0.1V to 3.3V) that sets the DC offset across the CC-OTA 36. The sensed inductor voltage received across the ISNSP and ISNSN terminals, after adjustment by the voltage sources 32 and 33, serves as the differential input voltage to the CC-OTA 36. A difference in current between the reference current source 38 and the output current of the CC-OTA 36 is provided to the series combination of the resistor $R_C$ and capacitor $C_C$ to generate the current ramp signal $I_{TH}$ provided to the comparator 39. The comparator 39 compares the current ramp signal $I_{TH}$ to a compensation signal from the slope compensation generator 42, which is controlled by the controllable oscillator 41. The output of the comparator 39 is provided to a reset input R of the flip-flop 43, while a clock signal from the controllable oscillator 41 controls a set input S of the flip-flop 43. The NOR gate 44 processes an inverted output QB of the flip-flop 43 and the clock signal to generate an input signal to the tri-state driver 45, which controls a voltage of the PWM terminal. When the tri-state driver 45 is enabled by the enable signal ENAB, the tri-state driver 45 provides a PWM signal to the PWM terminal to control one or more power switches to provide regulation. However, when the tri-state driver 45 is disabled (tri-stated), the PWM terminal does not control the one or more power switches.

In steady-state continuous conduction mode (CCM), the change of charge $\Delta Q$ into the capacitor $C_C$ is about 0 cycle-to-cycle because the CC-OTA 36 sources and sinks current in equal proportions.

Additionally, the resistor $R_C$ provides a current ramp signal $I_{TH}$ for the comparator 39.

FIG. 3 are graphs of one example of simulation results for the PWM control circuit 50 of FIG. 2. In particular, FIG. 3 includes a first graph 51 of the voltage of the VICTRL terminal versus time, a second graph 52 of control current versus time for the controllable voltage source 33, a third graph 53 of output current of the CC-OTA 36 versus time, a fourth graph 54 of inductor sense voltage and input voltage to the CC-OTA 36 versus time, a fifth graph 55 of the voltage of current ramp signal $I_{TH}$ and the voltage across capacitor $C_C$ versus time, and a sixth graph of inductor current (through an external inductor LEXT) versus time.

The graphs of FIG. 3 depict example simulation results for the PWM control circuit 50. However, other simulation results are possible.

Figure 4:
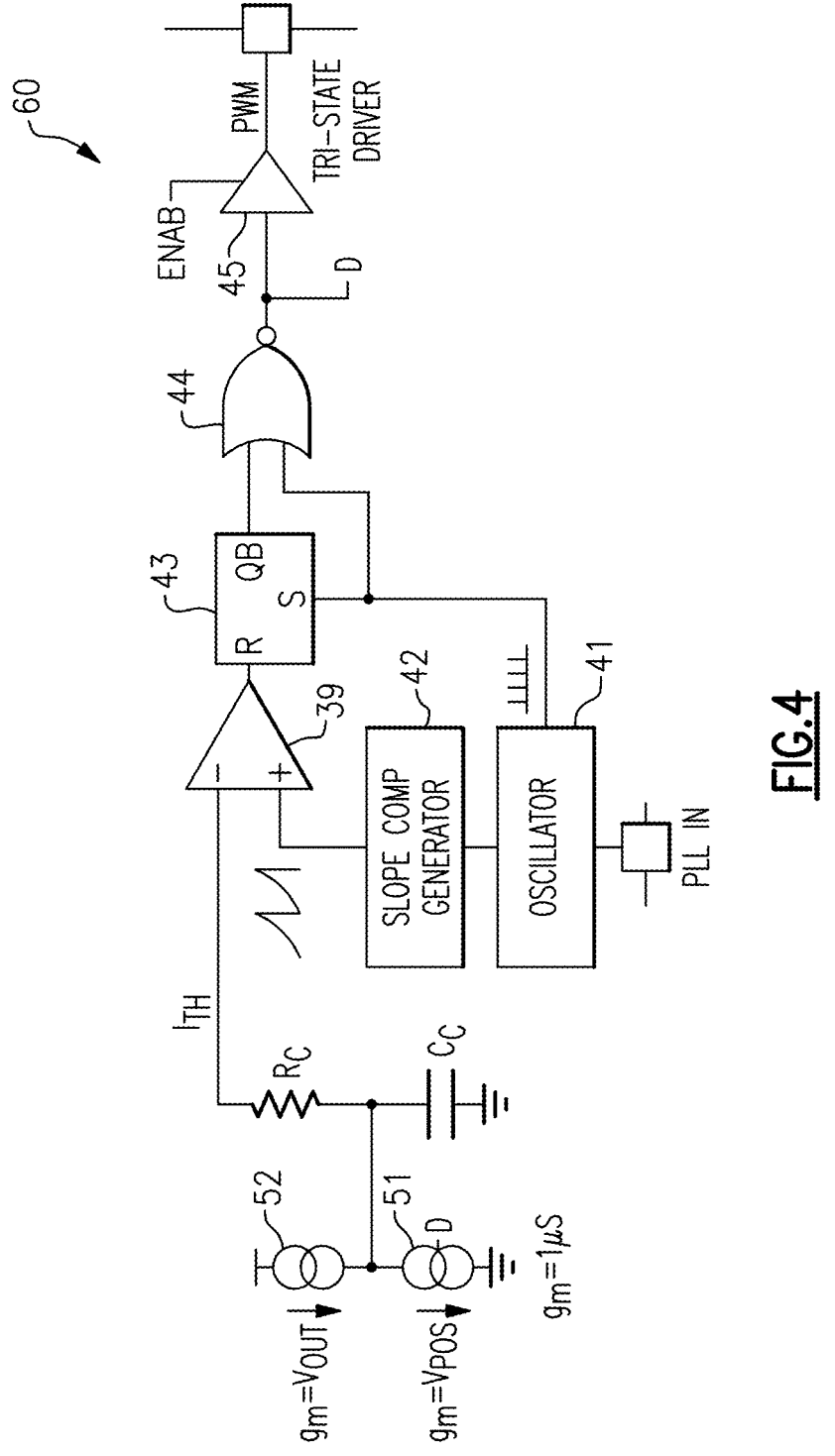
FIG. 4 is a schematic diagram of a portion of a pulse-width modulation control circuit according to another embodiment.

FIG. 4 is a schematic diagram of a portion of a PWM control circuit 60 according to another embodiment. The portion of the PWM control circuit 60 includes a PLL IN terminal, a comparator 39, a controllable oscillator 41, a slope compensation generator 42, a set-reset flip-flop 43, a NOR gate 44, and a tri-state driver 45 (controlled by an enable signal ENAB), which are similar to those of the PWM control circuit 50 of FIG. 2.

However, in comparison to the PWM control circuit 50 of FIG. 2, the embodiment of FIG. 4 further includes a first controllable current source 51 and a second controllable current source 52 for serving as a duty cycle control circuit. The first controllable current source 51 and the second controllable current source 52 are each connected to a node between the resistor $R_C$ and the capacitor $C_C$. The first controllable current source 51 sinks a first current from the integration capacitor $C_C$, while the second controllable current source 52 sources a second current to the integration capacitor $C_C$. The first current from the first controllable current source 51 is controlled based on a supply voltage to a power switch (for example, $V_{POS}$ of FIG. 1) with duty cycle D (corresponding to the duty cycle D of the output of the NOR gate 44). Additionally, the second current from the second controllable current source 52 is controlled based on an output voltage of a switch-mode power supply (for example, $V_{OUT}$ of FIG. 1).

With reference to FIGS. 1, 2, and 4, in certain embodiments herein, regulation of the current ramp signal $I_{TH}$ is performed prior to switching (for example, when pre-regulation of a load is occurring and the power switches are not yet being cycled to provide regulation) using currents derived from the voltages of the $V_{OUT}$ and $V_{POS}$ terminals.

Thus, the loop is closed prior to switching to servo the current ramp signal $I_{TH}$ to the correct value. Furthermore, $V_{POS}$ and $V_{OUT}$ are used to set charge and discharge currents for the integrating capacitor $C_C$.

In certain implementations, $D*(V_{POS}-V_{OUT})=(1-D)*V_{OUT}$ such that the switching servo loop sets D using currents.

Accordingly, when the enable signal ENAB tri-states the tri-state driver 45, the currents proportional to $V_{POS}$ and $V_{OUT}$ charge and discharge the integrating capacitor $C_C$.

Figure 5:
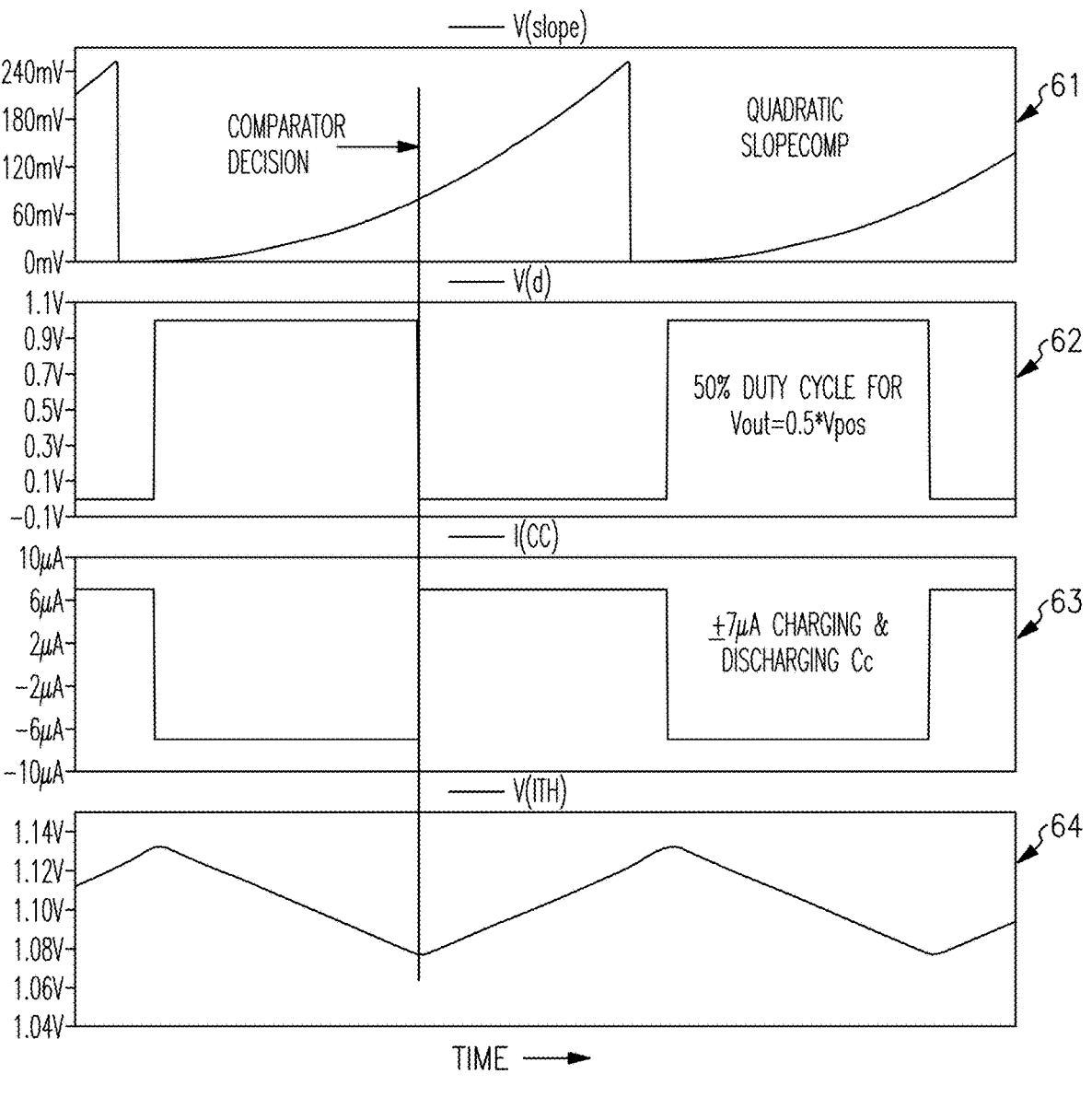
FIG. 5 are graphs of one example of simulation results for the pulse-width modulation control circuit of FIG. 4.

FIG. 5 are graphs of one example of simulation results for the pulse-width modulation control circuit 60 of FIG. 4. In particular, the graphs include a first graph 61 of slope voltage versus time for the comparator 39, a second graph 62 of the output of the NOR gate 44 versus time, a third graph 63 of the current into the capacitor $C_C$ versus time, and a fourth graph 64 of the voltage of the current ramp signal $I_{TH}$ versus time.

Figure 6:
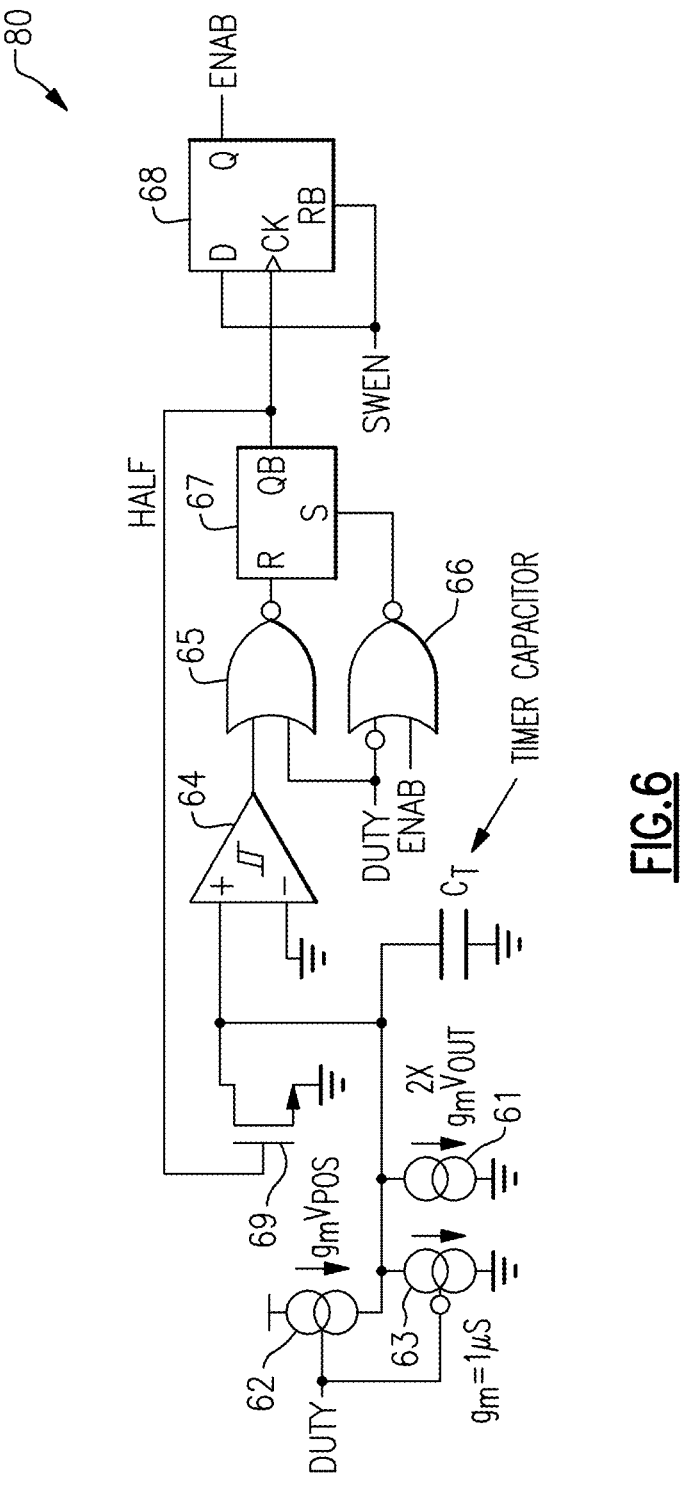
FIG. 6 is a schematic diagram of a timer circuit according to one embodiment.

FIG. 6 is a schematic diagram of a timer circuit 80 according to one embodiment. The time circuit 80 includes a first controllable current source 61, a second controllable current source 62, a third controllable current source 63, a timer capacitor $C_T$, a hysteretic comparator 64, a first NOR gate 65, a second NOR gate 66, a set-reset flip-flop 67, a D flip-flop 68, and an n-type field effect transistor 69.

The timer circuit 80 of FIG. 6 depicts one embodiment of a timer circuit for controlling the enable signal of a tri-state driver for a power switch. For example, the timer circuit 80 can be used to generate the enable signal ENAB, which can control enabling of a tri-state driver of a PWM control circuit (for example, the tri-state driver 45 of FIGS. 2 and 4) for generating the top gate control signal TG of the top power switch 13 and/or the bottom gate control signal BG of the bottom power switch 14 of FIG. 1. Although one embodiment of a timer circuit is shown, other implementations are possible.

In the illustrated embodiment, the first controllable current source 61 generates a first current controlled based on $V_{OUT}$, while the second controllable current source 62 generates a second current controlled based on $V_{POS}$ as well as a duty cycle signal DUTY. The hysteretic comparator 64 compares the voltage of the timer capacitor $C_T$ to a reference voltage (for example, ground) to generate a comparison signal. The comparison signal, the duty cycle signal DUTY and the tri-state enable signal ENAB are logically processed by the NOR gates 65 and 66 to control a state of the set-reset flip-flop 67. The output signal HALF of the set-reset flip flop 67 is used to control the NFET 69 to reset the voltage of the timer capacitor $C_T$, and also serves as a clock input (CK) to the D flip-flop 68. The data input (D) and reset bar (RB) input of the D flip-flop 68 are controlled by a switch enable signal SWEN (for example, received on terminal SWEN of FIG. 1), while the output (Q) of the D flip-flop 68 generates the tri-state enable signal ENAB.

With continuing reference to FIG. 6, the pre-switch servo loop sets duty cycle until ENAB rising edge, in this example. Additionally, a one-half ($\frac{1}{2}$) synchronous pulse initializes the inductor current waveform to deliver zero average output current after switching commences.

As shown in FIG. 6, the timer capacitor $C_T$ integrates a net current of the controllable current sources 61-63. Thus, the timer capacitor $C_T$ charges from zero when the duty cycle signal DUTY is high, and the charge current is proportional to a difference between $V_{POS}$ and $V_{OUT}$. Furthermore, the timer capacitor $C_T$ discharges when the duty cycle signal DUTY switches low with a current proportional to $2*V_{OUT}$. Moreover, synchronous switch time starts when the timer capacitor Cr reaches the initial condition and ends at new period.

Figure 7:
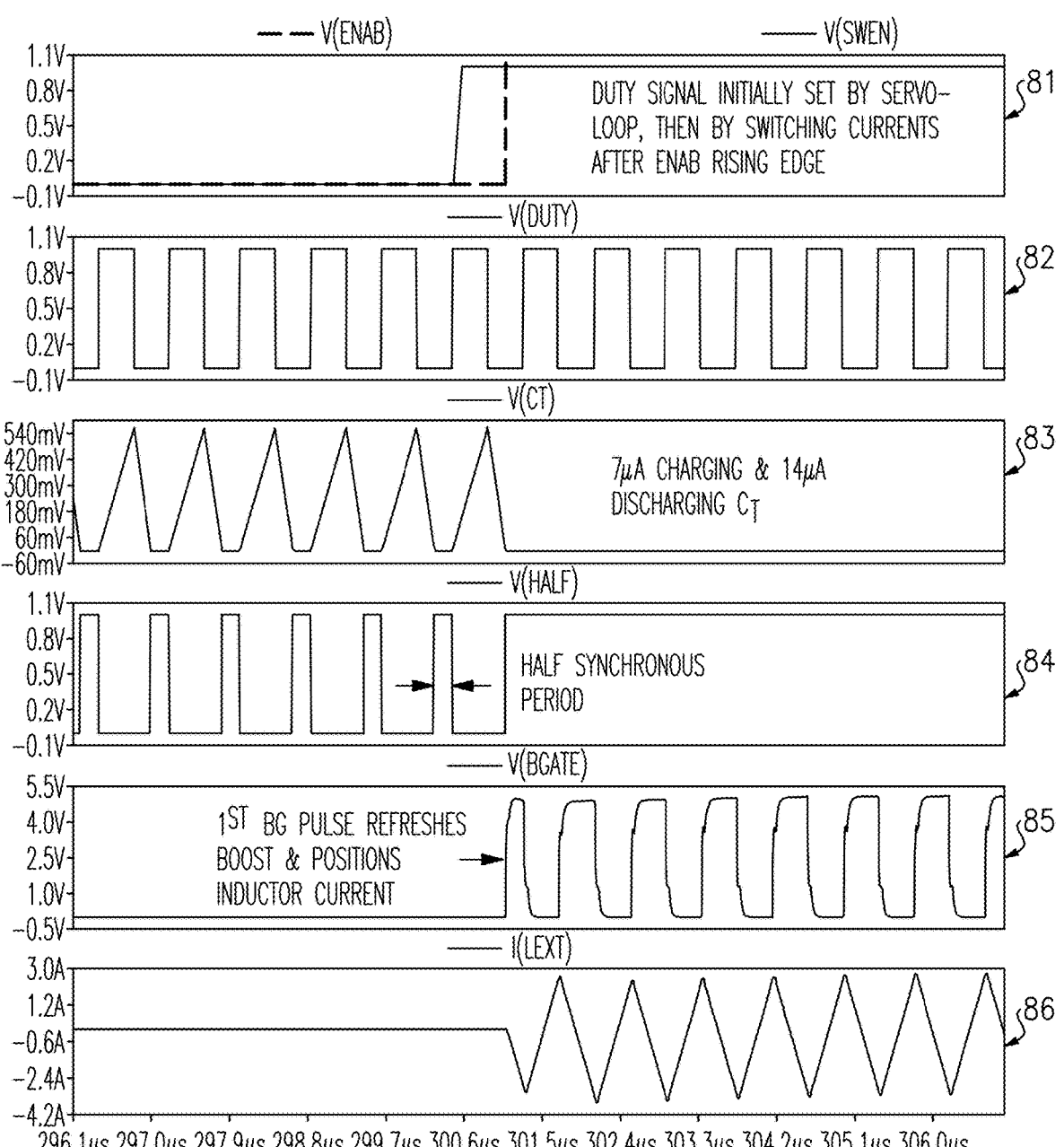
FIG. 7 are graphs of one example of simulation results for the timer circuit of FIG. 6.

FIG. 7 are graphs of one example of simulation results for the timer circuit 80 of FIG. 6. In particular the graphs include a first graph 81 of the voltages of the switch enable signal SWEN and the tri-state enable ENAB versus time, a second graph 82 of the voltage of the duty cycle signal DUTY versus time, a third graph 83 of the voltage of the timer capacitor $C_T$ versus time, a fourth graph 84 of the output signal HALF versus time, a fifth graph 85 of a voltage of a bottom gate control signal for a power switch versus time, and a sixth graph 86 of inductor current (of an external inductor) versus time.

Figure 8:
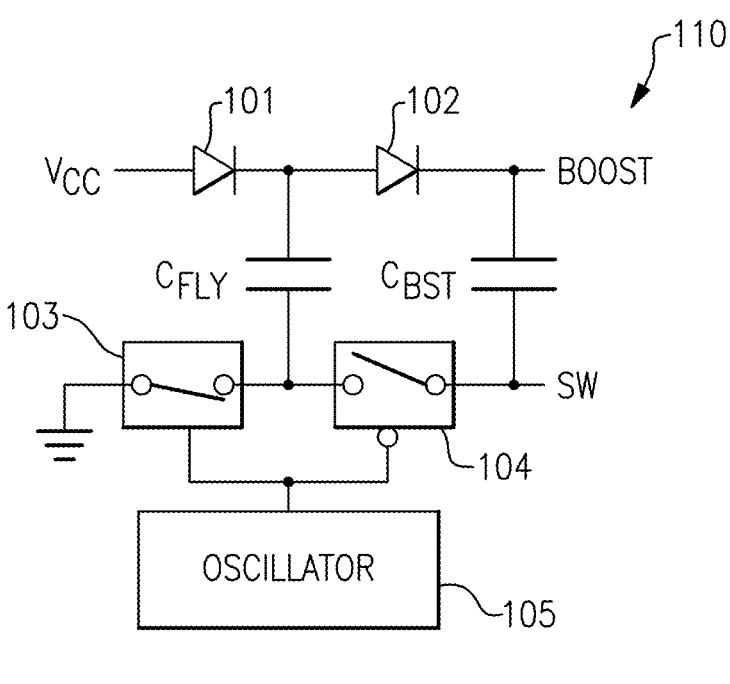
FIG. 8 is a schematic diagram of one embodiment of a boost charge pump.

FIG. 8 is a schematic diagram of one embodiment of a boost charge pump 110. The boost charge pump 110 includes a first diode 101, a second diode 102, a first switch 103, a second switch 104, an oscillator 105, a flying capacitor $C_{FLY}$, and a boost capacitor $C_{BST}$.

The boost charge pump 110 is powered by a supply voltage $V_{CC}$. The first diode 101 and the second diode 102 are connected in series (from anode to cathode) between the supply voltage $V_{CC}$ and the boost terminal BOOST. The first switch 103 is connected between ground and one end of the flying capacitor $C_{FLY}$, while the other end of the flying capacitor $C_{FLY}$ is connected to the node between the diodes 101 and 102. The second switch 104 is connected between the switch terminal SW (for example, the output SW of the power switches 11 of FIG. 1) and one end of the flying capacitor $C_{FLY}$. The oscillator 105 controls turning on and off of the first switch 103 and the second switch 104. The boost capacitor CBST is connected between the boost terminal BOOST and the switch terminal SW.

Figure 9:
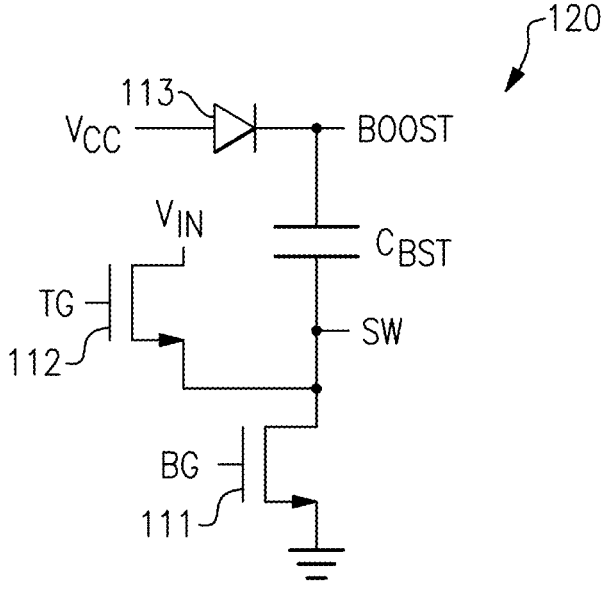
FIG. 9 is a schematic diagram of a boost refresh circuit according to one embodiment.

FIG. 9 is a schematic diagram of a boost refresh circuit 120 according to one embodiment. The boost refresh circuit 120 includes a diode 113 connected between the supply voltage $V_{CC}$ and the boost terminal BOOST, a first NFET 111 connected between the switch terminal SW and ground, a second NFET 112 connected between an input voltage terminal VIN and the switch terminal SW, and a boost capacitor $C_{BST}$ (corresponding to the boost capacitor $C_{BST}$ of FIG. 8) connected between the boost terminal BOOST and the switch terminal SW. The gate of the first NFET 111 is controlled by the bottom gate control signal BG, while the gate of the second NFET 112 is controlled by the top gate control signal TG.

Figure 10:
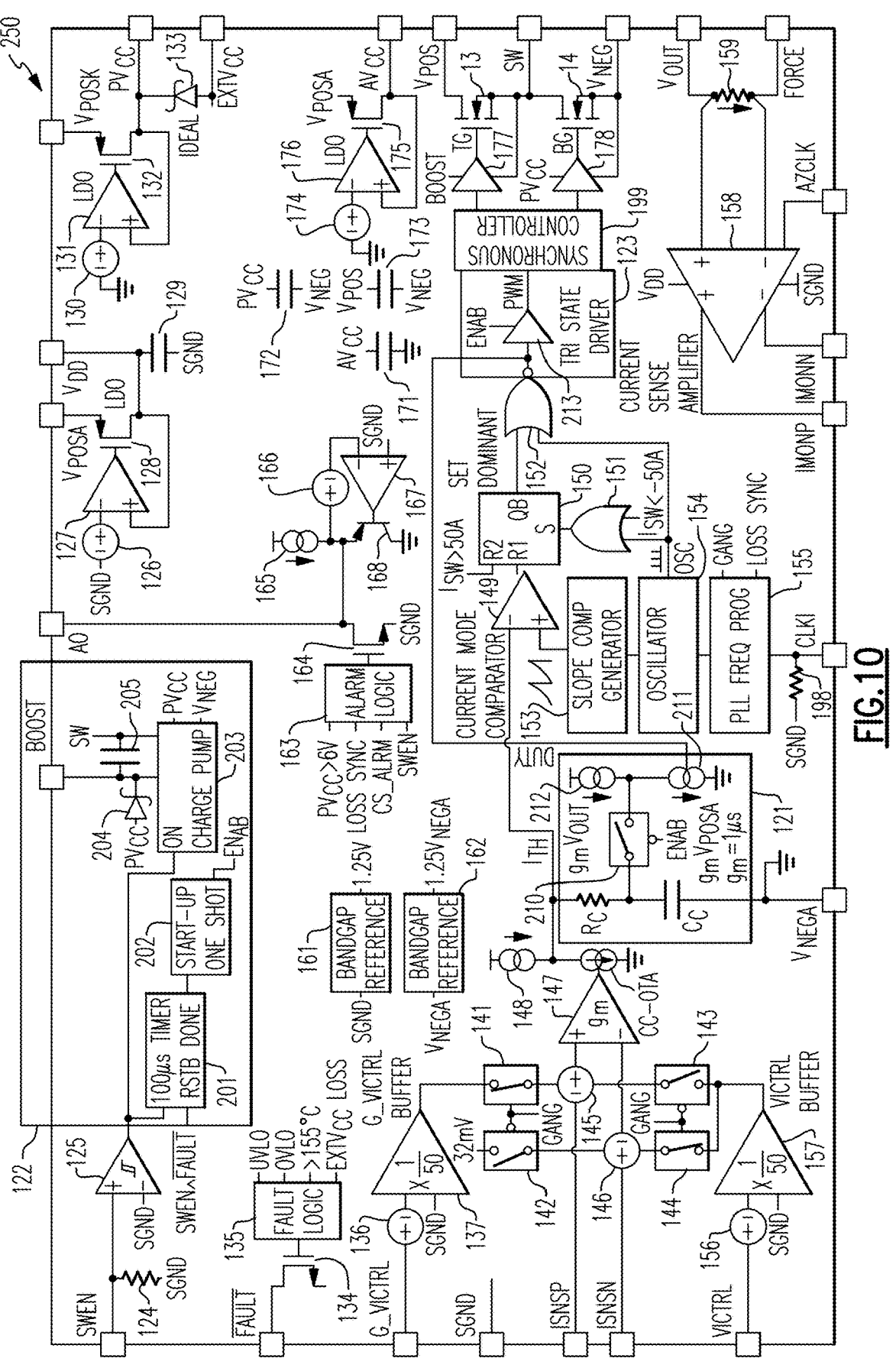
FIG. 10 is a schematic diagram of a switch-mode converter according to one embodiment.

With reference to FIGS. 8 and 9, the boost terminal BOOST provides a boosted supply voltage for the flying switch driver (for example driver 177 of FIG. 10) for the top power switch (for example, the top power switch 13 of FIGS. 1 and 10).

The boosted supply voltage should be a nominal voltage (for example, >3.5V) when switching starts.

However, driving the boost terminal BOOST using a linear regulator (for example, from the input voltage $V_{IN}$) can be insufficient at high output, which corresponds to least synchronous switch time. Moreover, at low $V_{OUT}$ such a configuration bleeds current into the switch terminal SW to maintain regulation, which could affect the low current ranges of the power supply.

In the illustrated embodiment, using the synchronous charge pump 110 of FIG. 8 to charge the boost terminal BOOST will cause a large output voltage excursion due to large negative inductor current. Thus, the charge pump 110 is better used for maintaining voltage during regular switching. Running, the charge pump 110 continuously during the idle phase introduces noise from the oscillator 105, and thus it is desirable to run the charge pump 110 up until just before the start of switching.

By including both the charge pump 110 of FIG. 8 and the boost refresh circuit 120 of FIG. 9 to generate the boosted supply voltage (with the charge pump 110 of FIG. 8 disabled during switching of power switches), the boosted supply voltage can be refreshed as needed (based on timing of the TG and BG signals for controlling the power switches)

while the charge pump 110 can be disabled at the start of switch to avoid the noise introduced by the oscillator 105.

FIG. 10 is a schematic diagram of a switch-mode converter 250 according to one embodiment. The switch mode converter 250 can be implemented in accordance with any combination of features of the present disclosure.

In the illustrated embodiment, the switch-mode converter 250 can be implemented as a semiconductor die (also referred to herein as an integrated circuit or IC), which includes pads or pins SWEN, BOOST, AO, $V_{POSA}$, $V_{DD}$, $V_{POSK}$, $PV_{CC}$, $EXTV_{CC}$, $AV_{CC}$, $V_{POS}$, SW, $V_{NEG}$, $V_{OUT}$, FORCE, AZCLK, IMONN, IMONP, CLKI, $V_{NEGA}$, VIC-TRL, ISNSN, ISNSP, SGND, G_VICTRL, and FAULT.

The switch-mode converter 250 further includes a duty cycle control circuit 121, a timer circuit 122, a tri-driver circuit 123, a first pull-down resistor 124 (between SWEN and SGND), a hysteretic comparator 125 (comparing SWEN and SGND), a first voltage source 126, a first error amplifier 127, a first regulator transistor 128 (connected between $V_{POSA}$ and $V_{DD}$ and controlled by an output of the first error amplifier 127), a first capacitor 129 (connected between $V_{DD}$ and SGND), a second voltage source 130, a second error amplifier 131, a second regulator transistor 132 (connected between $V_{POSK}$ and $PV_{CC}$ and controlled by an output of the second error amplifier 131), a first Schottky diode 133 (connected between $PV_{CC}$ and $EXTV_{CC}$), a fault transistor 134, and fault logic 135 (activating the fault transistor 134 to pull down FAULT (with logically inverted polarity showed by the line over FAULT) based on undervoltage UVLO, overvoltage OVLO, high temperature greater than 155°, or loss voltage to $EXTV_{CC}$.

With continuing reference to FIG. 10, the switch-mode converter 250 further includes a third voltage source 136, a first buffer 137 (connected to G_VICTRL through the third voltage source 136), a first switch 141 (controlled by signal GANG), a second switch 142 (controlled by signal GANG), a third switch 143 (controlled by signal GANG), a fourth switch 144 (controlled by signal GANG), a CC-OTA 147, a first controllable voltage source 145 (connected between ISNSP and the CC-OTA 147), a second controllable voltage source 146 (connected between ISNSN and the CC-OTA 147), a reference current source 148, a current mode comparator 149, a flip-flop 150, an OR gate 151 (comparing an oscillator signal OSC to a signal indicating $I_{SW}$ less than-50A), a NOR gate 152, a slope compensation generator 153, an oscillator 154 (generating the oscillator signal OSC), a phase-locked loop (PLL) frequency programming circuit 155 (connected to CLKI and receiving signals GANG and LOSS SYNC), a fourth voltage source 156, a second buffer 157 (connected to VICTRL through the fourth voltage source 156), a sense amplifier 158 (having output connected to IMONP and IMONN, powered by VDD and SGND, and clocked by AZCLK), and a sense resistor 159 (connected between VOUT and FORCE and sensed by the differential input of the sense amplifier 158).

The switch-mode converter 250 further includes a first bandgap reference 161 (receiving SGND and generating a 1.25V bandgap voltage referenced to SGND), a second bandgap reference 162 (receiving $V_{NEGA}$ and generating a 1.25V bandgap voltage referenced to $V_{NEGA}$), alarm logic 163 (processing signals SWEN, LOSS SYNC, CS_ALRM, and a signal indicating $PV_{CC}$ is less than 6V), an alarm transistor 164 (connected to AO and controlled by the alarm logic 163), a current source 165, a fifth voltage source 166, a third error amplifier 167, a bipolar transistor 168, a first decoupling capacitor 171 (connected between $AV_{CC}$ and ground), a second decoupling capacitor 172 (connected between $PV_{CC}$ and $V_{NEG}$), a third decoupling capacitor 173 (connected between $V_{POS}$ and $V_{NEG}$), a sixth voltage source 174, a third regulation transistor 175, a fourth error amplifier 176, a top power switch 13 (connected between $V_{POS}$ and SW and controlled by signal TG), a top power switch driver 177 (powered by BOOST and SW and outputting the signal TG to the top power switch 13), a bottom power switch 14 (connected between SW and $V_{NEG}$ and controlled by signal BG) a bottom power switch driver 178 (powered by $PV_{CC}$ and $V_{NEG}$ and outputting the signal BG to the bottom power switch 14), a second pull-down resistor 198 (connected between SGND and CLKI), and a synchronous controller 199 (for processing the output of the tri-state driver 123 to provide input signals to the top power switch driver 177 and the bottom power switch driver 178).

With continuing reference to FIG. 10, the duty cycle control circuit 121 includes a resistor $R_C$, a capacitor $C_C$, an enabling switch 210 (controlled by ENAB), a first controllable current source 211 (with a current set based on a voltage level of $V_{POSA}$ and selectively enabled using the duty cycle signal DUTY from the NOR gate 152), and a second controllable current source 212 (with a current set based on a voltage level of $V_{OUT}$). Additionally, the timer circuit 122 includes a timer 201 (initiated by the output of the first buffer 125), a start-up one shot circuit 202 (controlled by the output of the timer 201 and outputting ENAB for the tri-state driver 123), a charge pump 203, a second Schottky diode 204 (connected between $PV_{CC}$ and BOOST), and a boost capacitor 205 (connected between BOOST and SW). Furthermore, the tri-state driver 123 includes the tri-state driver 213, which receives the duty cycle signal DUTY and an output of the NOR gate 15, generates the PWM signal for the synchronous controller 199, and is enabled by ENAB.

Although FIG. 10 depicts one embodiment of a switch-mode converter, the teachings herein are applicable to other implementations of switch-mode converters.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A switch-mode converter comprising:
a first power switch configured to control an output current to an inductor to regulate a regulated output voltage, the first power switch connected between a first supply voltage and one end of the inductor;
a controller configured to control the first power switch based on a pulse width modulation (PWM) signal having a duty cycle; and
a start-up circuit configured to set an initial value of the PWM signal, wherein the start-up circuit includes a first current source having an output configured to generate a first current based on the first supply voltage and the duty cycle, a second current source having an output configured to generate a second current based on the regulated output voltage, a slope compensation generator configured to generate a slope compensation signal, and a comparator having a first input configured to receive the slope compensation signal and a second input connected to the output of the first current source and to the output of the second current source, the initial value of the PWM signal set based on an output of the comparator.

2. The switch-mode converter of claim 1, wherein the start-up circuit is configured to generate a difference current based on subtracting the second current from the first current.

3. The switch-mode converter of claim 2, wherein the start-up circuit comprises a capacitor configured to integrate the difference current, and a resistor in series with the capacitor.

4. The switch-mode converter of claim 3, wherein the start-up circuit further comprises a tri-state driver configured to generate the PWM signal based on the output of the comparator.

5. The switch-mode converter of claim 1, wherein the start-up circuit further includes a third current source having an output configured to generate a third current based on the duty cycle and a timer capacitor that is charged by the first current and discharged by the second current and the third current.

6. The switch-mode converter of claim 5, wherein the start-up circuit further comprises a tri-state driver configured to generate the PWM signal, wherein the tri-state driver is selective enabled based on a voltage across the timer capacitor.

7. The switch-mode converter of claim 1, wherein the initial value of the PWM signal corresponds to an initial duty cycle of the first power switch.

8. The switch-mode converter of claim 1, further comprising a second power switch connected between a second supply voltage and the first power switch.

9. The switch-mode converter of claim 1, further comprising a driver configured to drive the first power switch based on the PWM signal, wherein the driver is powered by a boosted supply voltage.

10. A method of voltage regulation in a switch-mode converter, the method comprising:

regulating a regulated output voltage by controlling an output current from a first power switch to an inductor, the first power switch connected between a first supply voltage and one end of the inductor;

controlling the first power switch based on a pulse width modulation (PWM) signal from a controller, the PWM signal having a duty cycle;

providing a first current from an output of a first current source of a start-up circuit, the first current generated based on the first supply voltage and the duty cycle;

providing a second current from an output of a second current source of the start-up circuit, the second current generated based on the regulated output voltage;

generating a slope compensation signal using a slope compensation generator of the start-up circuit; and setting an initial value of the PWM signal based on an output of a comparator of the start-up circuit, the comparator including a first input that receives the slope compensation signal and a second input that is connected to the output of the first current source and the output of the second current source.

11. The method of claim 10, further comprising providing the PWM signal as an output of a tri-state driver.

12. The method of claim 10, further comprising generating a third current based on the duty cycle using a third current source, charging a timer capacitor using the first current, discharging the timer capacitor using the second current and the third current, and selectively enabling the PWM signal based on a voltage across the timer capacitor.

13. The method of claim 10, wherein the initial value of the PWM signal corresponds to an initial duty cycle of the first power switch.

14. A switch-mode converter system comprising:

an inductor connected between a switch terminal and an output terminal; and a switch-mode converter comprising:

a first power switch configured to control an output current to the inductor to regulate a regulated output voltage at the output terminal, the first power switch connected between a first supply voltage and the switch terminal;

a controller configured to control the first power switch based on a pulse width modulation (PWM) signal having a duty cycle; and

a start-up circuit configured to set an initial value of the PWM signal based on sensing the regulated output voltage and sensing the first supply voltage, wherein the start-up circuit includes a first current source configured to generate a first current based on the first supply voltage and the duty cycle, a second current source configured to generate a second current based on the regulated output voltage, a slope compensation generator configured to generate a slope compensation signal, and a comparator having a first input configured to receive the slope compensation signal and a second input connected to the output of the first current source and to the output of the second current source, the initial value of the PWM signal set based on an output of the comparator.

15. The switch-mode converter system of claim 14, wherein the start-up circuit is configured to generate a difference current based on subtracting the second current from the first current.

16. The switch-mode converter system of claim 14, wherein the initial value of the PWM signal corresponds to an initial duty cycle of the first power switch.

17. The switch-mode converter system of claim 14, further comprising a load configured to receive the regulated output voltage.

18. The switch-mode converter system of claim 14, further comprising a control and sense circuit configured to provide the regulated voltage to the load in a first mode.

19. The switch-mode converter system of claim 18, wherein the control and sense circuit is configured to measure an electrical characteristic of the load in a second mode in which the switch-mode converter is driving the load with the regulated output voltage.

20. The switch-mode converter system of claim 14, wherein the start-up circuit further includes a third current source having an output configured to generate a third current based on the duty cycle, a timer capacitor that is charged by the first current and discharged by the second current and the third current, and a tri-state driver configured to generate the PWM signal, wherein the tri-state driver is selective enabled based on a voltage across the timer capacitor.

\* \* \* \* \*